United States Patent
Furois

[15] 3,688,194
[45] Aug. 29, 1972

[54] WAVEFORM TRANSIENT MEASURING CIRCUIT AND METHOD

[72] Inventor: Philippe C. Furois, Fishkill, N.Y.

[73] Assignee: International Business Machines Corporation, Armonk, N.Y.

[22] Filed: May 6, 1970

[21] Appl. No.: 35,050

[52] U.S. Cl.................324/188, 333/70 S, 333/84 M
[51] Int. Cl..........G04f 9/00, H03h 9/00, H01p 3/00
[58] Field of Search......324/188, 185; 328/129, 110, 328/109; 333/34, 70 S, 84 M

[56] References Cited

UNITED STATES PATENTS

| | | | |
|---|---|---|---|
| 3,204,180 | 8/1965 | Bray et al. | 324/188 |
| 3,370,231 | 2/1968 | Van Zurk | 324/188 |
| 2,939,002 | 5/1960 | Guillon et al. | 328/110 |
| 3,418,641 | 12/1968 | Fyfe et al. | 333/34 X |

*Primary Examiner*—Alfred E. Smith
*Attorney*—Hanifin and Jancin and Theodore E. Galanthay

[57] ABSTRACT

A waveform transient measuring circuit consisting of two transmission lines and a plurality of spaced coincidence detectors connecting the two lines. The two transmission lines have different propagation rates so that a first signal, introduced into the slower delay line is overtaken by a second signal introduced at a later time into the faster transmission line. The spaced coincidence detectors determine the exact point along the transmission lines at which predetermined corresponding amplitude conditions occur. By calibrating the transmission lines and precisely positioning the detectors, a very accurate time-amplitude measurement is obtained.

12 Claims, 10 Drawing Figures

INVENTOR
PHILIPPE C. FUROIS

BY Theodore E. Galanthay
AGENT

PATENTED AUG 29 1972

WAVEFORM TRANSIENT MEASURING CIRCUIT AND METHOD

BACKGROUND OF THE INVENTION

1. Field of the Invention

The invention relates to waveform-transient measuring circuits. More specifically, this invention relates to a circuit for determining the transient potential of a waveform at a particular instant of time with a resolution in the order of a few pico-seconds.

2. Description of the Prior Art

An increase in the speed of electronic switching circuits, particular electronic switching circuits of the type used in digital computers, has obsoleted presently known techniques for testing such circuits. Such high speed electronic switching circuits rely on precise timing for accuracy. When a large number of these circuits are interconnected to form a more complex network, even a small discrepancy in the operation of any one circuit can adversely affect the time coincidence needed at the input of a subsequent circuit. It is, therefore, necessary to test the circuits by accurately measuring their time-voltage characteristics.

High speed digital switching circuits are most commonly fabricated in integrated form and it is known to fabricate a plurality of circuits on a single semiconductor chip. The characteristics of such integrated circuits frequently cannot be measured by a repetitive testing system because of potential overheating. The characteristics of the circuit must therefore be measured quickly and on a single shot basis.

SUMMARY OF THE INVENTION

Accordingly, it is an object of this invention to accurately measure the time-voltage characteristics of a high speed digital switching circuit.

It is another object of this invention to perform the time-voltage measurement on a single shot basis.

In accordance with one aspect of the invention, two transmission lines having different propagation rates are provided. The first of these transmission lines is a strip-line having parallel ground planes spaced on either side. The second of the two transmission lines is either a micro-strip or micro-line having a ground plane spaced on only one side thereof. The strip-line having two ground planes has an inherently slower propagation rate than the micro-strip or micro-line which only has one ground plane. Coincidence detectors are attached to corresponding points along both the strip-line and the micro-line. With such an arrangement, a strobe impulse is inserted into one end of the strip-line and a signal pulse is inserted into the same end of the micro-line. The detectors are biased to switch their state when the potential of the micro-line has reached the corresponding potential of the strip-line. Therefore, as the signal in the micro-line "sweeps" the strobe impulse, a detector will be activated at a point where the signal pulse reaches the predetermined coincidence potential. From that point on, of course, the signal pulse is ahead of the strobe impulse and all subsequent detectors will also be activated. By appropriate calibration as described in greater detail hereinbelow, the precise instant of time at which the signal pulse reaches the predetermined potential is obtained by observing the first activated detector. In accordance with this embodiment, each of the transmission lines is constructed with a stepwise decrease in width in order to maintain a constant impedance. The particular stepwise decrease used by way of example in this specification is for equal spacing of the detectors.

In accordance with another aspect of the invention, transmission lines having the same rate of propagation are provided. With this embodiment, the strobe and input signals are introduced at opposite ends of the two transmission lines and a detector is activated at a point along the transmission lines where a coincident potential is reached.

The foregoing and other objects, features and advantages of this invention will be apparent from the following more particular description of the preferred embodiments of the invention, as illustrated in the accompanying drawings.

DESCRIPTION OF THE PREFERRED EMBODIMENTS

Figure 1:
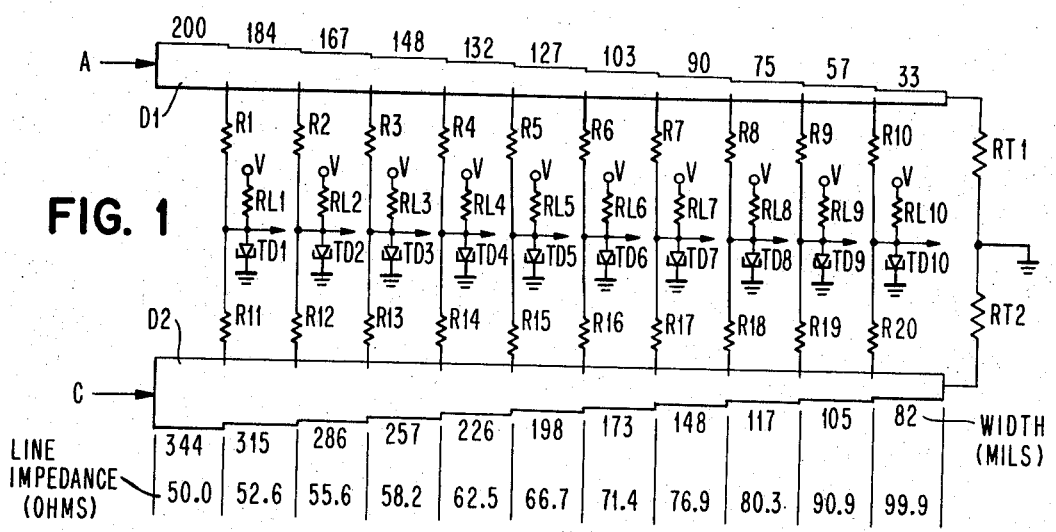
FIG. 1 is a schematic representation of a preferred embodiment of the invention.

Refer now to FIG. 1 for a description of the preferred embodiment. Transmission lines D1 and D2 are terminated to ground through resistors RT1 and RT2. At predetermined intervals, such as at 1 inch intervals, for example, the detector circuitry is connected to each transmission line. Since these transmission lines are utilized to provide varying degrees of delay "transmission" lines and "delay" lines are used interchangeably herein. Resistors R1 to R10 are connected to delay lines D1 and resistors R11 and R20 are connected to delay line D2 as shown. Each of these pairs of resistors are connected to a common point and further connected to a tunnel diode. Each tunnel diode is also connected to a source of bias consisting of a potential source V in series with a biasing load resistor. This biasing condition normally maintains the tunnel diodes in their lower state and will determine the voltage level on the unknown signal at which coincidence occurs. It then requires a combination of signals from both delay line D1 and D2 to activate a tunnel diode into its higher state. Each corresponding point along delay line D1 and D2 has its independent detector circuitry. For example, resistors R1 R11, RL1, and tunnel diode TD1 detect the potential levels at the first corresponding points along the delay lines; resistors R2, R12, and RD2 and tunnel diode 2 at the second such point, etc. Corresponding resistors such as R1 and R11, R2 and R12, . . . and R10 and R20 usually have the same value of resistance. By way of example, it has been found that 1,000 ohms is a convenient design value.

In order to maintain the impedance of the delay lines D1 and D2 at 50 ohms (which is also an arbitrarily chosen design value), it has been necessary to decrease the width of the center conductors as shown in FIG. 1. In the preferred embodiment this tapering has been shown as a stepwise decrease in the width of the conductor. The width and corresponding impedance at each increment are indicated in FIG. 1 by way of example for the particular dielectric material which is polyguide having a thickness of one-eight inch. In order to consistently maintain the 50 ohm impedance, the terminating resistors RT1 and RT2 should each have a value of 100 ohms. The values of RL1, RL2, etc. and the value of potential source V will vary somewhat with the particular tunnel diode chosen and the biasing of tunnel diodes in this manner is well-known to those skilled in the art. The output arrow at each of the detectors indicates an input to any convenient electronic sensor. Such electronic sensors could be simple indicator lights or a computer, depending on the desired sophistication of the overall system.

Figure 4:
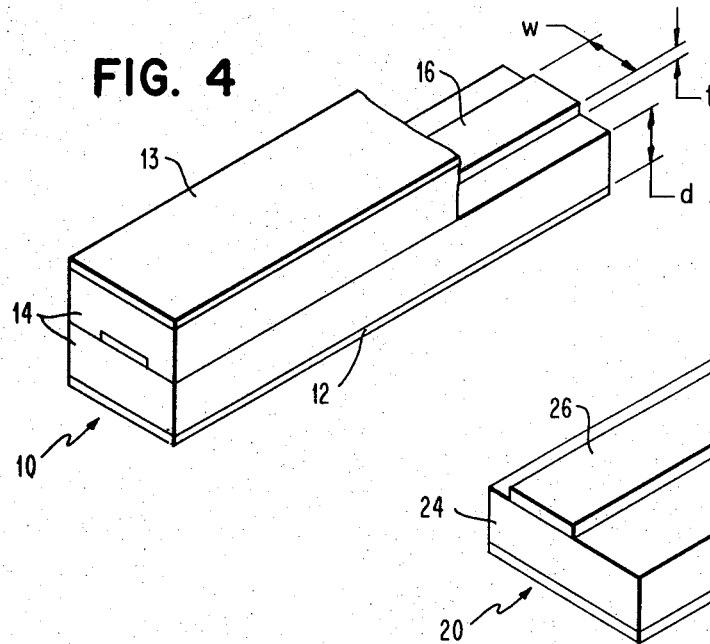
FIG. 4 is a fragmentary perspective view of a strip-line.

Refer now to FIG. 4 which shows a strip-line 10 adaptable for use as delay line D1 in FIG. 1. Strip-line 10 comprises a center conductor 16 embedded in dielectric material 14 which spaces conductor 16 between parallel ground planes 12 and 13. As depicted in FIG. 4, center conductor 16 has not yet been modified as shown in FIG. 1, the width $w$ being subsequently adjusted in accordance with the dimensions indicated in FIG. 1 at delay line D1 and the thickness $t$ is approximately 0.0028 inch. The depth $d$ of dielectric material 14 is approximately 0.125 inch the dielectric constant being approximately 2.41. Such a strip-line has a propagation rate of approximately 130 picoseconds per inch. The rate is given in inverted form from the normal expression for velocity, in order to facilitate the numerical expression and mechanical layout. A formula for calculating propagation time per unit length for a strip-line is as follows:

$t_d = 1.016 \sqrt{E_r}$ nanoseconds/feet where $E_r$ is the relative dielectric constant. A formula for calculating propagation time per unit length for a micro-strip is as follows:

$$t_d = 1.016 \sqrt{0.45 E_r + 0.67} \text{ ns/ft.}$$

Figure 5:
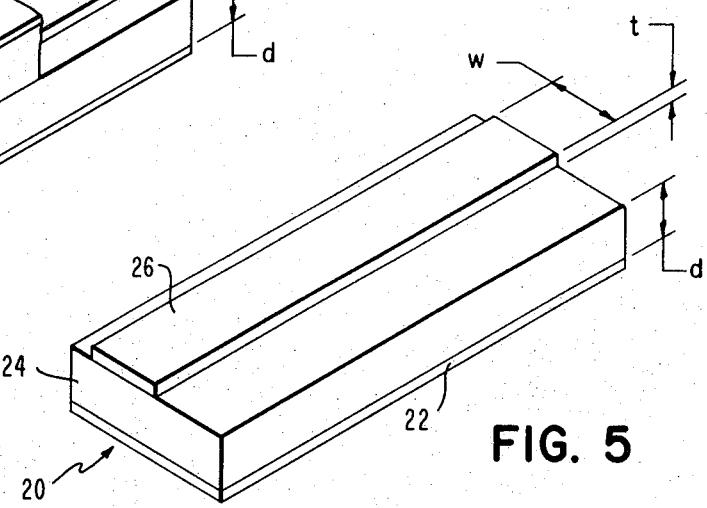
FIG. 5 is a perspective view of a micro-strip.
Figure 6:
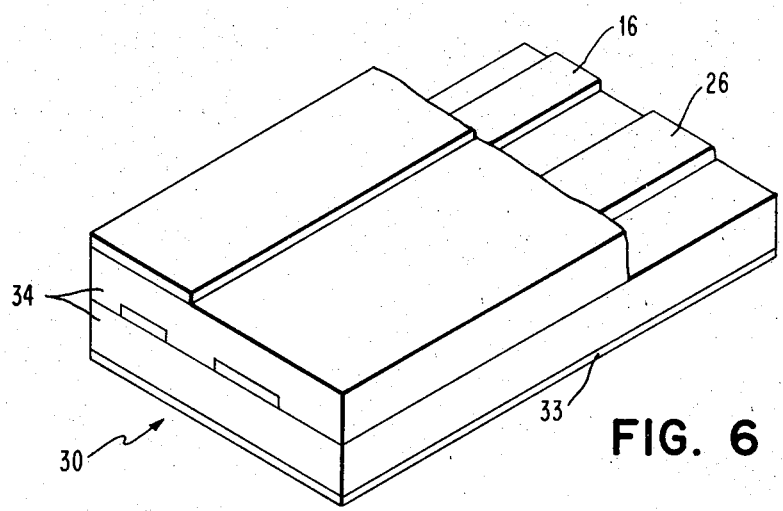
FIG. 6 is a fragmentary perspective view of a strip-line and micro-line in a single unitary package.

Refer now to FIG. 5 which depicts micro-strip 20. Micro-strip 20 comprises ground plane 22, dielectric 24 and conductor 26. There is no upper ground plane or covering dielectric as for strip-line 10. FIG. 6 shows a micro-line together with a strip-line in a single unitary package 30. The micro-line consists of center conductor 26 embedded in dielectric 24 with a ground plane 23 on only one side. The strip-line as previously shown at FIG. 4 consists of center conductor 16 with dielectric and ground planes on both sides. The micro-line is similar to the micro-strip of FIG. 6 differing only in that it includes dielectric 34 completely surrounding center conductor 26. The micro-strip and micro-line are also shown prior to the tapering of the width $w$. The center conductor in each of the FIGS. 4, 5, and 6 is shown prior to being modified in order to provide a constant impedance. The modification providing a constant impedance can be made with a blade which cuts the copper material in a fine line, or by chemical etching. It is apparent that such a process could also be automated. The micro-line has propagation rates similar to that of the micro-strip. Therefore either a micro-line or a micro-strip can be used as the faster propagating delay line together with the strip-line which has a slower rate of propagation.

Figure 7:
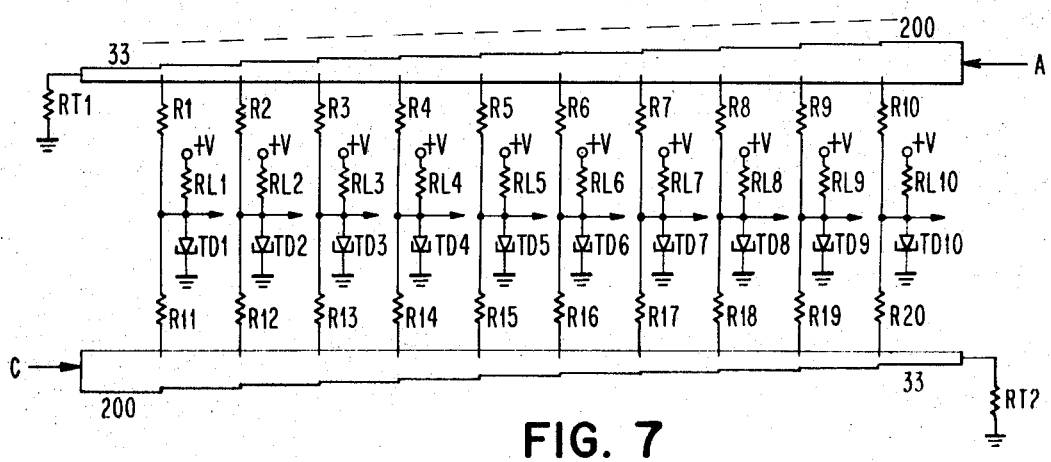
FIG. 7 is a schematic diagram of an alternate embodiment.

Refer now to FIG. 7 which shows an alternate embodiment. In this embodiment, each of the delay lines have the same rate of propagation. The known and unknown waveforms are introduced at opposite ends of each delay line and therefore opposite ends of each delay line are terminated by a resistor to ground. Corresponding components are labeled as in FIG. 1, and certain components are therefore left unlabeled to avoid crowding the drawing. The values given for the components in the embodiment of FIG. 1 apply to the embodiment of FIG. 7. The same step-tapering must be followed as in FIG. 1, except that the two lines are identical i.e., both are strip-lines, micro-lines or micro-strips. This must be done because R1 to R10 and R11 to R20 place a resistance in parallel with the characteristic impedance of the line. The impedance must be maintained by decreasing the width of the center conductor.

Figure 8:
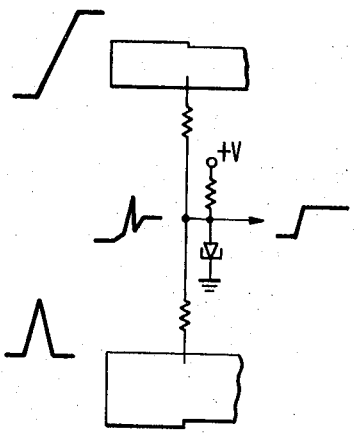
FIG. 8 is a single tunnel diode detector shown connected to detect positive-going waveforms.
Figure 9:
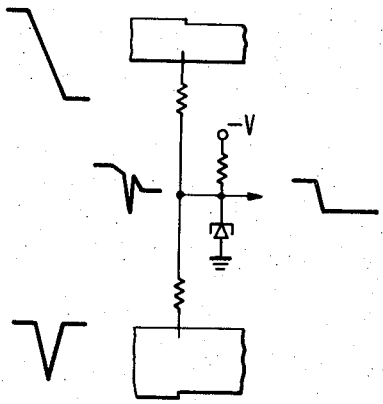
FIG. 9 is a tunnel diode shown connected to detect negative-going waveforms.
Figure 10:
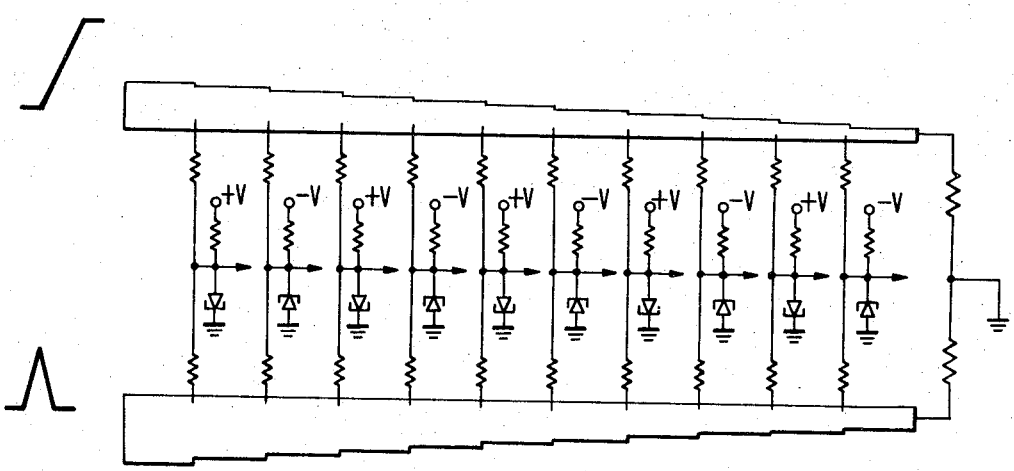
FIG. 10 shows tunnel diodes connected to detect both positive-going and negative-going waveforms.

Refer now to FIGS. 8, 9, and 10 which show tunnel diode detectors connected to detect positive-going and negative-going waveforms. FIG. 8 depicts the connection of a tunnel diode to detect positive-going waveforms. FIG. 9 depicts a tunnel diode detector connected to detect negative-going waveforms. FIG. 10 depicts tunnel diode detectors connected to detect both positive and negative-going waveforms. In the particular embodiment shown in FIG. 10, the detectors are alternately placed to detect positive and negative-going waveforms. In this embodiment if only positive-going waveforms are to be detected, then only every alternate detector is to be potentially activated. That is, the bias on the detectors is adjusted such that a predetermined amplitude level of a positive-going waveform is detected only by tunnel diodes connected to the +V source of potential. By analogy, the same is true if only a negative-going waveform is to be detected. However, if a complete pulse is to be analyzed, then all the detectors are utilized, thereby determining the time-amplitude characteristics of both the positive-going and negative-going portions of an unknown wave-form. This particularly useful if it is desired to measure both the rise-time and fall-time of an unknown pulse.

OPERATION

In operation, an important aspect of the invention depends on the difference in propagation rate between a strip-line (or micro-line) or two different transmission lines such as coax or lumped circuits. Such propagation rates are precisely determined in accordance with the previously mentioned formulas. Once this difference in propagation rate is determined, it remains a precise and stable condition since the delay line is a passive element. Once the relative propagation speeds are determined, detectors are spaced at convenient equal intervals depending on the resolution desired. The amount of resolution obtained, of course, is also variable by the relative propagation rate of the particular delay (or transmission) lines.

The attaching of the detectors at 1 inch intervals, for example, causes the impedance of the parallel delay lines to decrease at that point. Accordingly, it has been found, that the width of the center conductor must be decreased in order to compensate for this and maintain a constant impedance. This decrease in the width can be a stepwise decrease in width at the point along the delay line where the detectors are attached as shown in FIG. 1.

The characteristic impedance of a strip-line of low impedance (50 Ω) is provided by the formula:

$$Z_0 = \frac{9 \times 15}{\sqrt{E_r} \left[ \frac{W}{b-t} + \frac{C^1 f}{E^1} \right]} \text{ ohms}$$

where
$C^1 f$ is the center strip fringing capacitance
$E_r$ is the relative dielectric constant
$E^1$ is equal to $0.0885 E_r$
$b$ is the dielectric thickness
$w$ is the strip width
$t$ is the strip thickness
for the case in which:

$$W/b-t \geq 0.35 \text{ and } t/b \leq 0.25$$

The characteristic impedance of a micro-strip of low impedance (50 Ω) is provided by the formula:

$$Z_0 = 139.0 (1/\sqrt{E_r}) (W/b) - 0.581$$

where: $W/b \geq 1.20$

Figure 2:
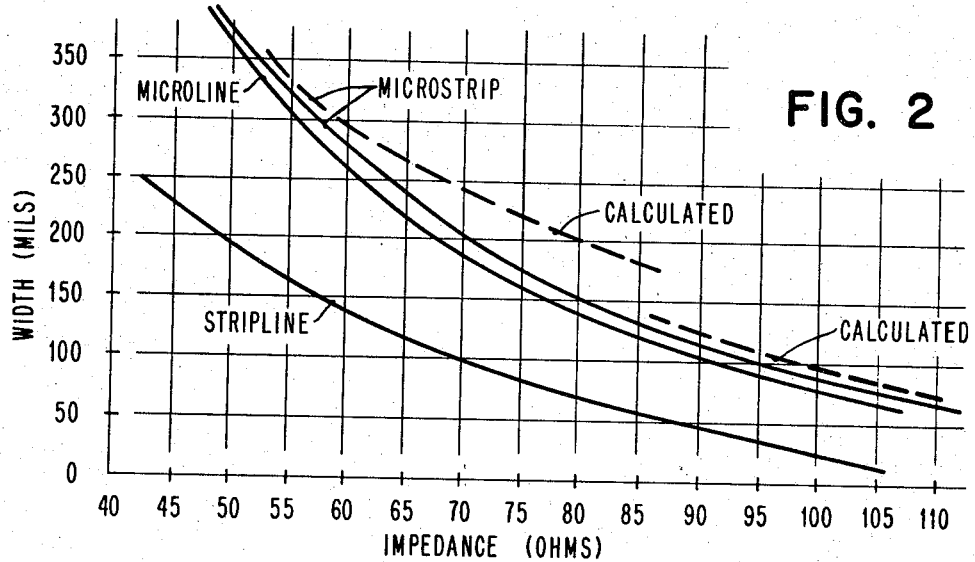
FIG. 2 is a series of graphical representations illustrating the calculated characteristics of the micro-strip and experimental characteristics of the strip-line, micro-strip and micro-line, for polyguide material.

These formulas are valid near low impedance of approximately 50 ohms and other formulas are valid near higher impedances such as 100 ohms. For example, for a strip-line having a high impedance (100 ohms) the impedance is provided by the formula:

$$Z_0 = (60/\sqrt{E_r}) Ln [46/\pi d_0]$$

where: $t/b \leq 0.25$ and $W/b-t \leq 0.35$
$d_0$ is equal to $0.67 (0.8 w + t)$ However, a discontinuity occurs at approximately 83 ohms. For this reason, the graph of FIG. 2 was constructed from experimental data in order to determine the actual required width of the center conductor in each of the delay lines. The width/impedance characteristics of a strip-line, micro-line and micro-strip as obtained from experimental data is shown in FIG. 2. Also shown is the calculated characteristics of a micro-strip in accordance with the above formula, clearly illustrating the discontinuity near 83 ohms. From the graph of FIG. 2 the actual dimension of the delay line in FIG. 1 are obtained. The actual decrease in impedance is determined by resistors R1, R2, R3, etc. In the present example, each of these resistors R1, R2, etc. are equal to 1,000 ohms. The line impedance required for each step between these resistors is given by the well-known formula for calculating parallel resistance:

where: $Z = $ *impedance of previous step*

$$Z = 50 R_1/R^1 - 50$$

From this formula it is determined that 52.6 ohms in parallel with 1,000 ohms provides an impedance of 50.0 ohms. Entering the graph of FIG. 2 at 52.6 ohms indicates that the width of the strip-line should be approximately 184 mils and the width of the micro-line should be approximately 315 mils, at the point where the first 1,000 ohms is connected. All subsequent widths of the strip-line, micro-line (or micro-strip) are obtained in this manner.

Figure 3:
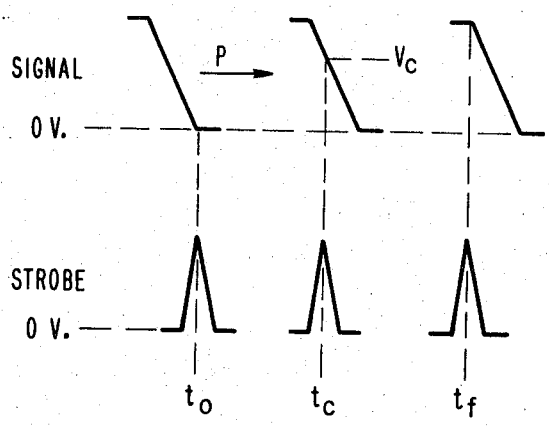
FIG. 3 is a series of waveform diagrams representing a strobe and signal waveform.

Refer now to FIG. 3 for a detailed description of the operation of the circuit of FIG. 1. A signal is introduced into the micro-line D2 at C and propagates to the right as indicated by the arrow. At the same time $t=t_0$ a strobe signal is introduced into the strip-line D1 at A. The bias on the detectors is selected in accordance with the desired conditions for activating the appropriate tunnel diode. As indicated in FIG. 3, the signal waveform propagates at a faster rate than the strobe pulse until time $t=t_c$ is reached at which time the first tunnel diode is activated. The signal waveform continues to propagate at a faster rate than the strobe pulse and will exit the delay line at time $t=t_f$. Once the signal waveform has passed he strobe pulse, all subsequent tunnel diodes will also be activated. Accordingly, activation of a given tunnel diode provides the meaningful information concerning the time-amplitude characteristics of the signal waveform with respect to the strobe signal. The amplitude of the strobe signal is fixed. The requirement for the proper functionning of the coincidence detector is that it cannot be activated with only one signal present. Only the bias on the detector will determine what level on the incoming signal will cause coincidence to occur. With high bias on the detector, the coincidence will be at a low level on the signal with low bias, the concidence will be at a high level on the signal. By determining which level on the signal must be detected, a time position is known with respect to the time position of the strobe. This is done by selecting the bias on the detectors.

In order to determine the rise-time of a signal waveform, two sets of delay lines as shown in FIG. 1 are used. The bias on the detectors for one line are adjusted to have coincidence at the 10 percent of the signal amplitude and the bias on the detectors of the second line are adjusted to have coincidence at the 90 percent of the signal amplitude. The first set is used to determine the 10 percent point of the signal pulse and the second set is used to determine the 90 percent point. By comparing the time duration required to reach the 10 percent point with that required to reach the 90 percent point, the very accurate indication of the rise-time of the waveform is obtained.

The embodiment of FIG. 7 operates in a manner similar to that of FIG. 1. A noteworthy difference is that the two waveforms propagate at the same rate and must therefore be introduced at opposite ends of the delay lines. The resolution of this alternate embodiment is not as flexible or accurate as that of the preferred embodiment. The actual physical structure becomes a constraint.

In FIG. 7 the resolution is determined by the actual spacing of the detectors on the line (not the difference of propagation rates or spacing as in FIG. 1). If the propagation velocity is ≈ 33 pico-seconds/cm., the resolution of the system will be at best 66 pico-seconds. For a resolution of 10 pico-seconds the physical position of the detectors would be around one-eighth inch which is beyond mechnical reality at this time with size of components.

In conclusion, there has been described a waveform transient measuring circuit consisting of two transmission lines and a plurality of evenly spaced coincidence detectors connecting the two lines. The preferred embodiment relies for the accuracy of resolution on the difference in propagation rates between the two transmission lines. Each of the transmission lines is constructed to maintain a constant impedance throughout its length. There has also been described a method for determining the time-amplitude characteristics of an unknown waveform to a very high degree of accuracy.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for determining the time-amplitude characteristics of an unknown waveform comprising:
   a first transmission line propagating a known waveform at a first propagation rate, said first transmission line being a strip-line;
   a second transmission line propagating said unknown waveform at a second propagation rate, said second transmission line being a micro-line having a faster propagation rate than said first transmission line, the unknown waveform thereby overtaking the known waveform; and
   a plurality of detectors connected to corresponding points along the length of each said transmission line for detecting a predetermined relationship between said known and unknown waveforms thereby determining the time-amplitude characteristics of said unknown waveform.

2. Apparatus as in claim 1 wherein:
   each said transmission line has its center conductor width decreased along its length thereby maintaining a constant impedance.

3. Apparatus as in claim 2 wherein:
   the decrease in width is stepwise at each said corresponding point along the length of each said transmission line where said detectors are connected.

4. Apparatus as in claim 1 wherein:
   the waveform in the strip-line propagates at 130 pico-seconds per inch;
   the waveform in the micro-line propagates at 112 pico-seconds per inch;
   the discriminators are connected at 1 inch intervals along the length of each said transmission line;
   whereby the resolution for detecting the predetermined relationship between said known and unknown waveform is approximately 18 pico-seconds.

5. Apparatus as in claim 4 wherein:
   the spacing of the detectors is less than 1 inch and the time resolution is greater than 18 pico-seconds.

6. Apparatus as in claim 4 wherein:
   the spacing is greater than 1 inch and the time resolution is less than 18 pico-seconds.

7. Apparatus as in claim 4 wherein:
   the difference in the propagation rate between the two transmission lines is less than approximately 18 pico-seconds per inch whereby the resolution for detecting the predetermined relationship between said known and unknown waveform is greater than 18 pico-seconds per inch of transmission line.

8. Apparatus as in claim 1 wherein:
   the plurality of detectors comprise tunnel diodes.

9. Apparatus as in claim 8 wherein:
   any one of the said tunnel diodes is switched from one state to the other in response to predetermined corresponding potential levels of the known and unknown waveforms.

10. Apparatus for determining the time-amplitude characteristics of an unknown waveform comprising:
    a first transmission line propagating a known waveform at a first propagation rate;
    a second transmission line propagating said unknown waveform at a second propagation rate; and
    a plurality of detectors connected to corresponding points along the length of each said transmission line for detecting a predetermined relationship between said known and unknown waveform thereby determining the time-amplitude characteristics of said unknown waveform, said plurality of detectors comprising detectors for detecting a predetermined relationship between positive-going known and unknown waveforms, and detectors for detecting a predetermined relationship between negative-going known and unknown waveforms, thereby determining the time-amplitude characteristics of both positive going and negative-going unknown waveforms.

11. The method of measuring the rise-time of an unknown waveform comprising the steps of:
    propagating a reference waveform along a first strip-line;
    propagating the unknown waveform along a first micro-line;
    detecting coincidence between said reference waveform and said unknown waveform for determining a first amplitude level of said unknown waveform, said first level used as the lower level for computing rise-time;
    propagating a second reference waveform along a second strip-line;
    propagating said unknown waveform along a second micro-line;
    detecting coincidence between said second reference wave-form and said unknown waveform for determining a second amplitude level of said unknown waveform, said second level being the upper level for computing rise-time;
    comparing the time of occurrence of the lower amplitude level and the upper amplitude level, thereby obtaining an indication of the rise-time of said unknown waveform.

12. The method of claim 11 for measuring the fall-time of an unknown waveform wherein negative-going pulses are detected such that the step of comparing comprises:

comparing the time of occurrence of the upper amplitude level with the lower amplitude level, thereby obtaining an indication of the fall-time of said unknown waveform.

* * * * *